W. A. ALLEN AND C. C. ABBE.
TIRE PRESSURE GAUGE.
APPLICATION FILED JAN. 8, 1910. RENEWED JUNE 6, 1921.

1,402,729.

Patented Jan. 10, 1922.

Fig.1  Fig.2  Fig.3

Witnesses:

Inventor
William A. Allen & Chas. C. Abbe

UNITED STATES PATENT OFFICE.

WILLIAM A. ALLEN, OF YONKERS, NEW YORK, AND CHARLES C. ABBE, OF ESSEX FELLS, NEW JERSEY, ASSIGNORS, BY DIRECT AND MESNE ASSIGNMENTS, TO A. SCHRADER'S SON, INCORPORATED, OF NEW YORK, N. Y., A CORPORATION OF NEW YORK.

TIRE-PRESSURE GAUGE.

1,402,729.   Specification of Letters Patent.   Patented Jan. 10, 1922.

Application filed January 8, 1910, Serial No. 537,044. Renewed June 6, 1921. Serial No. 475,559.

*To all whom it may concern:*

Be it known that we, WILLIAM A. ALLEN, residing in Yonkers, Westchester County, State of New York, and CHARLES C. ABBE, residing in Essex Fells, county of Essex, State of New Jersey, and both citizens of the United States of America, have invented certain new and useful Improvements in Tire-Pressure Gauges, of which the following is a specification.

Our invention relates to the construction of pressure gauges, more particularly such as are intended for testing air pressure in the pneumatic tires of automobile wheels and the like. The main object of our invention is to so construct the gauge that it will be simple and economical to manufacture, not liable to get out of order, will indicate the pressure accurately, be convenient to carry and handle and to apply to the tire nipple, and finally, that the indication of the pressure may be maintained temporarily after removal of the device from the tire nipple.

In the accompanying drawing—

Fig. 1 is a side elevation of our improved gauge;

Fig. 2 is a vertical section of the same;

Fig. 3 is an elevation, partly in section of the internal piston.

The principal parts of the device comprise the outer tubular case A, the internal tubular piston B, and the spiral pull spring D, connecting the upper closed end of the piston B with the lower end of the outer case A. As a convenient means of connecting the ends of the spring to these parts, we provide a cross-pin $d$ passing through a transverse opening in the piston head $b$ and a loop at the corresponding end of the spring, while a pin $d^1$ passes through a loop at the other end of the spring and bears against the lower end of the case A, Fig. 2. A ferrule $a$ screwed onto the lower end of the case A carrying a nipple plate E helps to hold the pin $d^1$ in place. The nipple part $e$ of the plate E has openings $e^1$ for the admission of air to the inner or underside of the piston, when on application of the device to the tire nipple, the surrounding rubber gasket or other yielding packing F has been pushed back, and the tire valve then opened by the nipple part of the plate E.

The upper end of the tubular piston B is closed by a plug or head $b$, while the lower end may have an external cupped packing $b^1$, Fig. 3, to make a close sliding fit within the case A. The outer case is nearly twice as long as the piston, so as to enclose the latter in all its positions and its upper end is closed by a cap $a^1$. As an indicating means, we prefer to form on or affix to the head $b$ of the piston a projection $p$ entering a longitudinal slot $s$ in the outer case, and on the outer face of the case, alongside the slot, graduations $x$, (Fig. 1) are marked to indicate the air pressure by the rise of the piston against the pull of the spring, the projection $p$ acting as the pointer.

We provide means whereby the pressure indications may be registered, that is, the indication of pressure maintained after the device has been taken off the tire nipple. In the drawings we have shown provided on the exterior of the piston B, a series of ratchet teeth $t$ with which may engage a projection or finger $t^1$ on a spring arm T. This spring arm consists of a moderately long flat blade secured at one end to the outside of the case at $y$, while its free end, carrying the projection or finger $t^1$, lies about midway of the length of the case. By making this tubular case upwards of twice the length of the piston, so as to inclose the latter at all times, I provide an implement convenient to be grasped and held in the hand in various ways, no matter in what position it has to be applied to the tire nipple. And the free end of the spring arm being about midway of the length of the case, is in convenient position to be pressed by the finger or thumb of the user, no matter in what position the instrument be held by him. If this spring arm T is made to normally press inwards, it will serve to latch behind the ratchet teeth $t$, as the air pressure forces the piston upwards, and thus keeps registered the pressure until the arm T is pulled back again. Or the spring of the arm T may be away from the piston, and the user may grasp the instrument in such a way that the thumb or a finger may press on the arm T and press its finger $t^1$ into engagement with the piston when applying the instrument to the tire nipple. It may be so held when removed from the tire nipple and until the recorded pressure can be examined. This is a feature of practical importance, for often the tires have to be tested in the dark or in dark places, where the graduations cannot be seen, while the instrument is being held on the tire nipple.

Our invention does not relate to that class of gauges in which the expansion chamber comprises tubes arranged one in extension of the other, but is confined, in its main features, to a gauge in which there is an enclosing tube, wholly within which is embraced an inner tube, and accordingly we do not claim as our invention a pressure gauge comprising two telescopic tubes forming an expansible air chamber, an extension spring within said tubes connected to the respective tubes for normally contracting the tubes, means at one end of one tube for cooperating with the air valve of a pneumatic tire to depress the valve stem and open the valve and admit air to the interior of said tube, the other tube being closed at its end remote from said valve opening end of the cooperating tube, one of the tubes having graduations for indicating the amount of extension of the tubes and the corresponding air pressure.

We claim as our invention—

A portable pressure gauge for pneumatic tires comprising an elongated casing having at one end means to make a tight joint with a tire valve by opening it over the latter and having means at such end for opening such valve to permit communication of air from the tire to the gauge and said gauge having an indicating member adapted to slide along said casing when moved by air pressure while the gauge is in communication with the valve, said casing being of sufficient length to extend beyond the indicating member at all positions of the latter, and means operative in all positions of the gauge for holding said indicating member temporarily in its indicating position after such communication is broken whereby the indication may be read after the gauge is removed from the tire valve, such means comprising a spring arm connected to the exterior of the casing and adapted to automatically engage said indicating member in its varying positions.

In testimony whereof we have signed our names to this specification, in the presence of two subscribing witnesses.

WM. A. ALLEN.
CHARLES C. ABBE.

Witnesses:
WALTER ABBE,
HUBERT HOWSON.